United States Patent [19]
Hudson

[11] Patent Number: 6,011,836
[45] Date of Patent: Jan. 4, 2000

[54] IN-LINE CONTROL OF TELEPHONY DEVICE

[75] Inventor: Michael Hudson, Portland, Oreg.

[73] Assignee: Diamond Multimedia Systems, Inc, San Jose

[21] Appl. No.: 08/805,081

[22] Filed: Feb. 24, 1997

[51] Int. Cl.[7] .................................................. H04M 11/00
[52] U.S. Cl. ............................ 379/102.02; 379/93.11; 379/93.26
[58] Field of Search ........................... 379/93.09, 93.11, 379/93.17, 93.23, 93.26, 100.15, 100.16, 102.01–102.06, 74, 204

[56] References Cited

U.S. PATENT DOCUMENTS

| | | | |
|---|---|---|---|
| 4,219,699 | 8/1980 | Nilssen et al. ........................ | 379/204 |
| 4,748,656 | 5/1988 | Gibbs et al. ......................... | 379/93 |
| 5,109,407 | 4/1992 | Fujita et al. ...................... | 379/102.02 |
| 5,119,412 | 6/1992 | Attallah .......................... | 379/102.07 |
| 5,592,538 | 1/1997 | Kosowsky et al. ................... | 379/93 |
| 5,633,917 | 5/1997 | Rogers ............................. | 379/74 |

*Primary Examiner*—Curtis A. Kuntz
*Assistant Examiner*—George Eng
*Attorney, Agent, or Firm*—Gerald B Rosenberg; New Tech Law

[57] ABSTRACT

A system to control and monitor telephony devices that do not digitally interface with a control device, such as a PC, is disclosed. The control device communicates with the telephony device typically via standard telephone cable using tones to convey status and control information.

21 Claims, 2 Drawing Sheets

IN-LINE CONTROL OF TELEPHONY DEVICE

BACKGROUND OF THE INVENTION

1. Field of the Invention

This invention relates to telephony devices and specifically to control by a computer system of telephony devices.

2. Related Art

Telephony devices are generally devices that are capable of transmitting and/or receiving information to/from a telephone network, e.g., via telephone lines to/from a telephone service provider and/or phone lines owned by a telephone service provider. Telephony devices such as modems, speakerphones, facsimile machines, and answering machines have grown enormously in popularity in recent decades. Concurrently, business and home computer systems, such as PC's, have also enjoyed a surge of popularity. Along with the growing popularity of PC-type computer systems has come a movement to control various appliances, including telephony devices, with PC-type devices. To implement such computer control, devices are usually controlled by digital signals (i.e., signals which transmit information in binary codes implemented with high and low voltages) from the computer system and require interface circuitry as well as certain network protocol support circuitry to be in place. Such interface and protocol support circuitry can take up considerable space in a telephony device and significantly raise its costs.

The close relationship of some telephony devices, such as modems, to computer systems has allowed their successful control by computer systems, including PC-type systems. Modems are, however, generally controlled by digital signals from the computer system. Other types of telephony devices, particularly speakerphones and other voice transmitting/receiving devices, have not experienced the same successful control by computer systems as modems. Despite occasional attempts to incorporate voice transmitting and receiving telephony devices such as speakerphones into PCs, the result is often poor performance defined by a low signal-to-noise ratio. Thus, it is desirable to develop a system where a voice transmitting and receiving telephony device can be controlled from a computer system without performance loss. Moreover, because many telephony devices tend to be relatively inexpensive, it is desirable to develop such a system so that the ultimate consumer sees little increase in cost.

SUMMARY OF THE INVENTION

A system that allows the control of a telephony device from a computer system or other control device is disclosed. To control the telephony device a controlling device causes a tone to be sent to the telephony device. The telephony device receives the tone and recognizes the tone as a control signal and then responds appropriately. The tones are sent, in one embodiment, to the telephony device via a standard telephone cable, which is connected to the telephony device with an RJ-11 connector. The tones are DTMF signals in one embodiment of the invention and sub-audible tones in another embodiment. In certain embodiments of the invention, the telephony device may also signal changes in its state to a controlling device using the same signaling methods and signal paths.

The system is advantageous in that it allows for the control and monitoring of a telephony device over a standard telephone cable.

The system is further advantageous in that it is inexpensive to implement.

Other advantages will be apparent to those of skill in the art from a review of the detailed description below.

BRIEF DESCRIPTION OF THE DRAWINGS

The present invention is described with respect to particular exemplary embodiments thereof and reference is accordingly made to the drawings (which are not necessarily drawn to scale), where like reference numbers denote like parts, in which.

DETAILED DESCRIPTION

Figure 1:
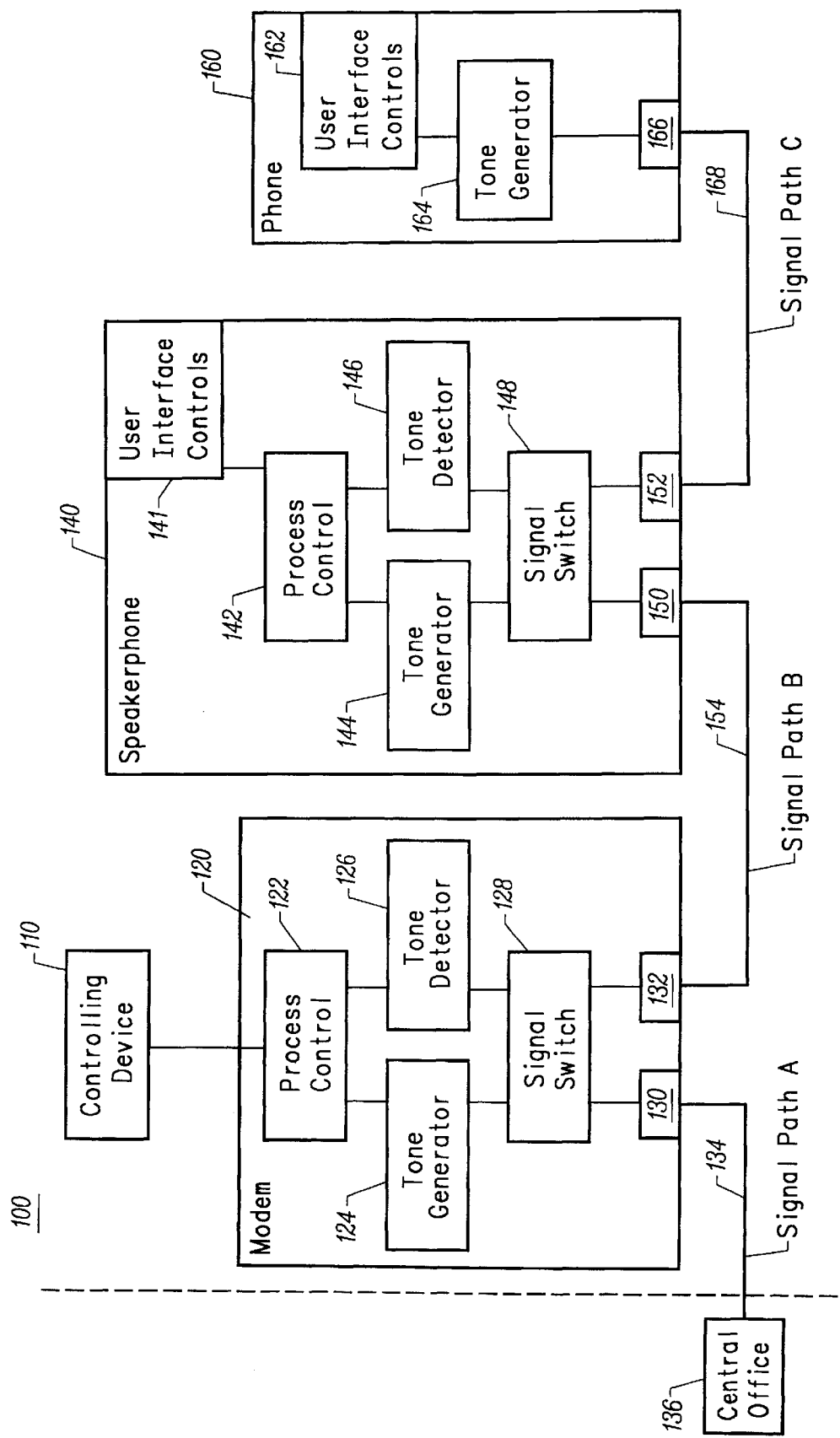
FIG. 1 is a functional block diagram of one embodiment of a system in accordance with the invention.

To overcome the problems described above, a system 100 in accordance with the invention is disclosed and shown in FIG. 1. Controlling device 110, which may be a computer system having a processor and a memory in various embodiments of the invention, is coupled to modem 120. Modem 120 includes process control unit 122, which is coupled to each of tone generator 124 and tone detector 126. Tone generator 124 and tone detector 126 are each coupled to signal switch 128. Signal switch 128 is coupled to each of connector 130 and connector 132. In one embodiment of the invention, each connector 130 and 132 are RJ-11 connectors, commonly used in telephony communications.

Connector 130 is coupled to Signal Path A 134, which is typically standard telephone cable. Signal Path A 134 is ultimately connected to a telephone service provider 136, commonly referred to herein as a "Central Office" or "CO", and located external to system 100.

Signal Path B 154 couples modem 120 to speakerphone 140 with standard telephone cable via connectors 132 and 150. Speakerphone 140 includes user interface controls 141 (e.g., volume, power, etc.), which are accessible and adjustable by a user. User interface controls 141 are coupled to process control unit 142. Process control unit 142 is coupled to each of tone generator 144 and tone detector 146. Tone generator 144 and tone detector 146 are each coupled to signal switch 148. Signal switch 148 is coupled to each of connectors 150 and 152, which are each RJ-11 connectors in one embodiment of the invention.

While shown in speakerphone 140 and modem 120 with the same names, the functional elements identified in speakerphone 140 and modem 120 are not necessarily identical although they may perform similar functions. For instance, process control unit 122 may include various network interface and protocol recognition circuitry, while process control unit 142 may not.

Further, in one embodiment of the invention, speakerphone 140 is connected to phone 160 or other telephony device. In the embodiment shown in FIG. 1, phone 160 includes user interface controls 162 (e.g., volume, number pad, etc.), which are coupled to tone generator 164, which is further coupled to connector 166, an RJ-11 connector. Speakerphone 140 is coupled to phone 160 via Signal Path C 168, which in one embodiment is common telephone cable.

In other embodiments of the invention, speakerphone 140 may be replaced by other telephony devices, such as a fax machine or an answering machine, containing similar elements to those shown in speakerphone 140. Thus, speakerphone 140 is used as an example only and is not intended to limit the invention to speakerphones only. In a similar manner, modem 120 could be replaced by another telephony device although such a telephony device would also require the digital interface to the controlling device already enjoyed by most modems. Further, while modem 120 is shown separate and independent from control device 110, it is to be understood by those of skill in the art that modem 120 could be incorporated within control device 110 such as a PC-type computer.

In operation, control device 110 sends a command signal to modem 120 in a manner known to those with skill in the art. Such a command signal will be a digital signal in various embodiments of the invention. If the command signal contains control information destined for speakerphone 140, modem 120 recognizes that fact through various codes in the command signal. Process control unit 122 in conjunction with tone generator 124 then generates tones corresponding to the speakerphone control information in the command signal. The tones are subsequently sent via Signal Path B to speakerphone 140.

The tones generated by tone generator 124 can be single frequency tones, dual frequency tones or sub-audible tones in various embodiments of the invention. In one embodiment, the tones generated are dual tone multiple frequency (DTMF) tones. There are sixteen defined DTMF tones generally known in the art. These tones are generally comprised of two tones of varying frequencies having a power relationship to one another (e.g., one tone is generally 20% more powerful than the second tone). DTMF tones are popular in communications and are generally preferable to single tones because single tones can be mistaken for voice data, while DTMF tones are defined to be tones rarely replicated by the human voice. Further, DTMF tones can be detected when they are very quiet signals (e.g., even when they have been significantly attenuated). The most common use of DTMF tones is in touchtone phones. However, while touchtone phones and general communication practices use only twelve DTMF signals, one embodiment of the invention uses all sixteen defined DTMF tones.

In another embodiment of the invention, the tones used are sub-audible tones. Sub-audible tones are single-frequency tones having frequencies below the frequencies used to transmit standard telephony data between the CO and the end user. Typically, a CO such as a phone company uses a passband in the range of 300–3200 Hz. Thus, in one embodiment of the invention, sub-audible tones under 300 Hz are used to signal control information.

Upon receipt of the tones sent via Signal Path B, the speakerphone detects the tones with tone detector 146. The process control unit 142 decodes the information carried in the tones. When various control tones are detected, a change of state to the speakerphone is indicated (e.g., a change from an "off state" to an "on state"), and the process control unit 142 causes the speakerphone to respond and change state appropriately.

Similarly, if a user operates the user interface controls of speakerphone 140, a change of state from the speakerphone is signaled to control device 110 in much of the same manner. That is, speakerphone 140 generates tones (e.g., single tones, DTMF tones, or sub-audible tones) with tone generator 144, and the tones are sent via Signal Path B 154 to modem 120. Modem 120 detects the tones via tone detector 126 and then sends via process control unit 122 an appropriate digital signal to control device 110 to inform it of the change of state in speakerphone 140.

When either modem 120 or speakerphone 140 is idle, signal switch 128 and/or signal switch 148 shorts the connectors 130 and 132 and/or 150 and 152 together, respectively. Therefore, external telephony signals can pass directly to the intended device (e.g., phone 160) when other devices are inactive.

Figure 2:
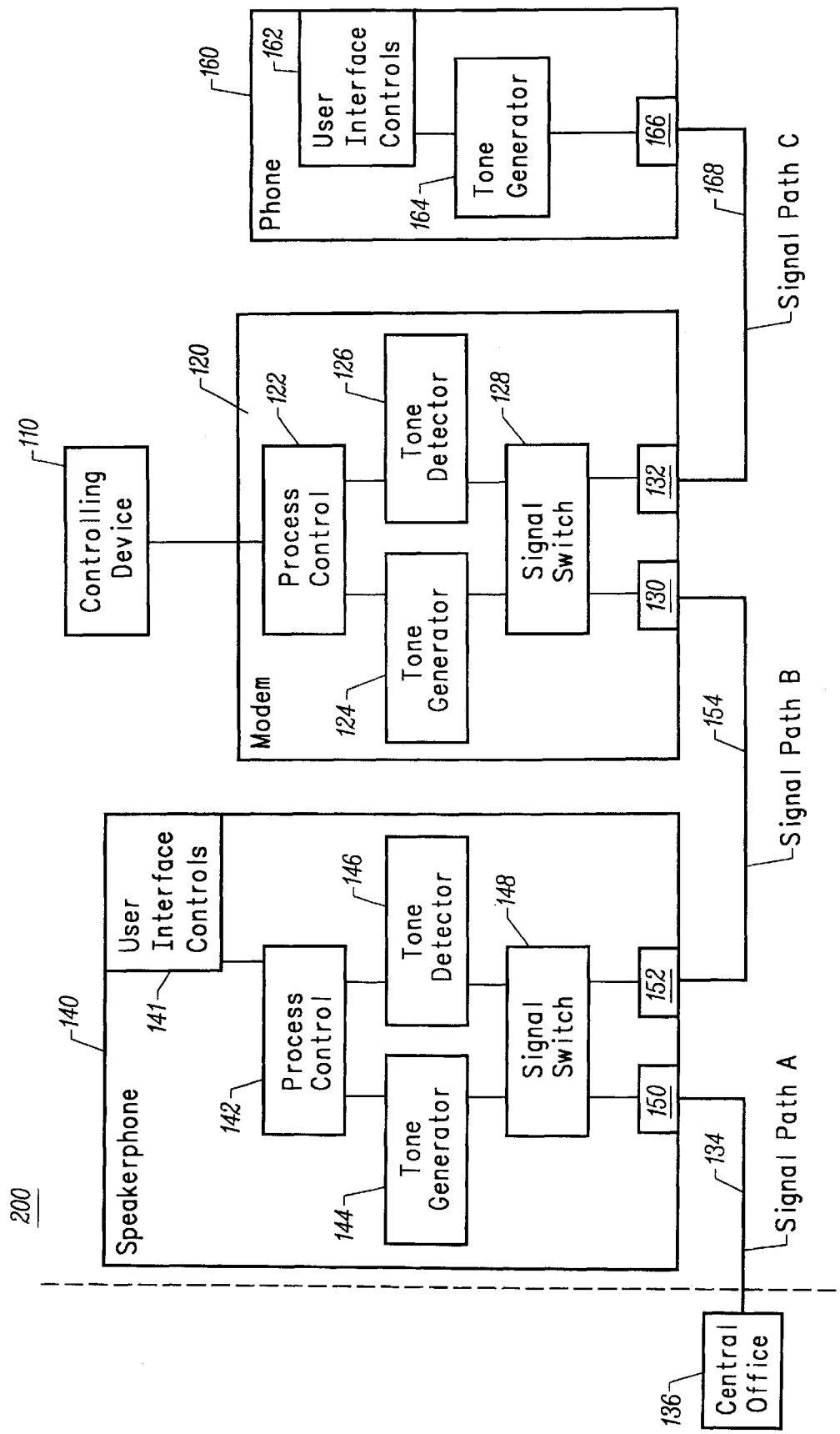
FIG. 2 is a functional block diagram of a second embodiment of a system in accordance with the invention.

A second embodiment of the invention is shown in FIG. 2. The system shown in FIG. 2 is similar in almost all respects to system 100 shown in FIG. 1, except in FIG. 2 speakerphone 140 is upstream of the modem 120 and/or control device 110 with respect to CO 136, while in FIG. 1 speakerphone 140 was downstream of modem 120. Specifically, in FIG. 2, speakerphone 140 is coupled directly to Signal Path A 134 which is ultimately coupled to CO 136.

Speakerphone 140 is coupled to modem 120 via Signal Path B 154. Modem 120 is coupled to phone 160 via Signal Path C 168. As in FIG. 1, various embodiments of FIG. 2 utilize standard telephone cable for each of Signal Paths A, B and C, 134, 154, and 168 as well as RJ-11 connectors for each of connectors 130, 132, 150, 152, and 166.

Operation of system 200 is similar to system 100 of FIG. 1. That is, the control information can be sent through modem 122 to speakerphone 140 via control tones generated by modem 120. The tones can be single, dual, or sub-audible tones. The tones are sent via Signal Path B, to speakerphone 140.

An important distinction between the embodiments of FIG. 1 and FIG. 2 is the direction the tones from the controlling device and/or modem are being sent, i.e., upstream toward the CO or downstream away from the CO. In the embodiment of FIG. 1, because control tones are being sent from modem 120 downstream in the telephony path, away from CO 136, there is little risk that CO 136 will receive any tones generated by modem 120 in system 100. But, in system 200 of FIG. 2, when a control tone is sent from modem 120 upstream to speakerphone 140, there is a risk that certain tones could be received by CO 136. In particular, if using DTMF tones, a CO may receive the tones and mistake the tones as touchtone or other command signals. Even if using the four DTMF tones not used as touchtone signals, a CO could misinterpret these tones as internal CO command signals.

Therefore, in the embodiment of FIG. 2, sub-audible tones are preferred in signaling speakerphone 140 or other upstream device. Sub-audible tones are unlikely to be "heard" by the CO. If a sub-audible tone is transferred to line 134, then en route from system 200 to CO 136 outside lines significantly attenuate the sub-audible tone. Thus, by the time the sub-audible tone signal reaches the CO, the signal will experience significant roll-off such that if any signal arrives at all at the CO, the signal will be seen as nothing more than slight line noise. Unlike sub-audible tones, attenuation does little to affect DTMF tones as they are still recognizable even when very quiet.

Likewise, in FIG. 1, when sending status tones to modem 120 to signal a change in device 140 state, sub-audible tones may be preferred in certain embodiments, especially when system 100 is connected to a CO 136.

It will be recognized by those with skill in the art that the system disclosed in FIGS. 1 and 2 is advantageous in that it allows traditionally non-networked telephony devices to be controlled via a single telephone cable by a computer system or other controlling device. Adding support for such control entails only slight additional costs and can be done with hardware, software and/or firmware.

Further, numerous slave telephony devices could be incorporated into such a system (100 or 200), enabling centralized control of a wide variety of devices without having to design the telephony devices to directly interface in a traditional manner with a computer system. Such a system allows sophisticated control of telephony devices without a significant cost increase to the ultimate consumer.

In addition, the system is further advantageous in that should a telephony device that does not support such a communication protocol receive the various control tones generated, the tones are benign to such a device and will simply be ignored.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A system including a telephony device, an additional device, and a controlling device, said controlling device including a processor and a memory, wherein said system receives externally generated telephony signals from a phone service provider via a first signal path, said system comprising:

means for receiving, by said telephony device, a control tone initiated by said controlling device via a second signal path;

means, within said telephony device, for recognizing said control tone;

means, within said telephony device, for responding to said control tones means, within said additional device, for receiving a digital command signal from said controlling device, wherein said digital command signal contains control information for controlling said telephony device; and means, within said additional device, for generating said control tone in response to said digital command signal and for sending said control tone to said telephony device.

2. The telephony device of claim 1, wherein said telephony device further includes means for communicating a state tone to said controlling device via said second signal path.

3. The telephony device of claim 2, wherein said means for recognizing said control tone includes a tone detector.

4. The telephony device of claim 3, wherein said means for communicating a state tone includes a tone generator.

5. The telephony device of claim 3, wherein said tone detector is for detecting a DTMF tone as said control tone.

6. The telephony device of claim 3, wherein said tone detector is for detecting a sub-audible tone as said control tone.

7. A system for receiving externally generated telephony signals from a phone service provider via a first signal path, said system comprising:

a) a controlling device, including a processor and a memory;

b) a second signal path;

c) a telephony device, in communication with said controlling device via said second signal path;

d) means in said telephony device for receiving a control tone via said second signal path;

e) means for recognizing said control tone;

f) means for responding to said control tone;

g) means in said telephony device for communicating a state tone to said controlling device via said second signal path, wherein said state tone indicates a state change in said telephony device h) an additional device coupled to said controlling device wherein said additional device includes means for receiving a digital command signal from said controlling device, wherein said digital command signal contains control information for controlling said telephony device;

means for generating said control tone in response to said digital command signal and for sending said control tone to said telephony device.

8. The system of claim 7, wherein:

said means in said telephony device for recognizing a control tone includes a tone detector; and said means in said telephony device for communicating state information includes a tone generator.

9. The system of claim 8, wherein said control tone includes a DTMF tone.

10. The system of claim 8, wherein said control tone includes a sub-audible tone.

11. The system of claim 8, wherein said means for receiving a control tone includes an RJ-11 connector.

12. The system of claim 7, wherein said additional device includes means for selectively transferring said externally generated telephony signals to said telephony device.

13. The system of claim 12, wherein said additional device is a modem.

14. The system of claim 13, wherein said telephony device is a speakerphone.

15. A system for receiving externally generated telephony signals from a phone service provider via a first signal path, said system comprising:

a controlling device, including a processor and a memory;

a second signal path;

a telephony device, having an interface in communication with said controlling device via said second signal path to receive a control tone and to transmit a state tone, said telephony device further including a control tone detector, a process control unit, and a tone generator; and an additional device, coupled to said controlling device, that receives a digital command signal from said controlling device, wherein said digital command signal contains control information for controlling said telephony device, said additional device generating said control tone in response to said digital command signal and sending said control tone to said telephony device.

16. The system of claim 15, wherein said control tone detector detects DTMF tones.

17. The system of claim 15, wherein said control tone detector detects sub-audible tones.

18. The system of claim 15, wherein said interface includes an RJ-11 connector, said first signal path includes a first telephone cable, and said second signal path includes a second telephone cable.

19. In a system having a first telephony device, a second telephony device, and a controlling device, said controlling device including a processor and a memory, wherein said system receives externally generated telephony signals from a phone service provider via a first signal path, a method comprising the steps of:

initiating, by said controlling device, the transmission of a control tone to said first telephony device via a second signal path;

receiving, by said first telephony device, said control tone;

recognizing, by said first telephony device, said control tone;

responding, by said first telephony device, to said control tone;

transmitting, by said first telephony device, a state tone through said second signal path, wherein said state tone indicates a state change in said first telephony device;

receiving, by said second telephony device from said controlling device, a digital command signal for said first telephony device; and generating, by said second telephony device, said control tone in response to said digital command signal.

20. The method of claim 19, wherein said step of recognizing said control tone includes detecting a DTMF tone.

21. The method of claim 19, wherein said step of recognizing said control tone includes detecting a sub-audible tone.

* * * * *